US009585298B2

(12) United States Patent
Henry et al.

(10) Patent No.: US 9,585,298 B2
(45) Date of Patent: Mar. 7, 2017

(54) AGRICULTURAL IMPLEMENT ACTUATOR SENSOR PROJECTION

(71) Applicant: CNH Industrial Canada, Ltd., Saskatoon (CA)

(72) Inventors: James W. Henry, Saskatoon (CA); Mark Wileniec, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/565,854

(22) Filed: Dec. 10, 2014

(65) Prior Publication Data
US 2015/0156951 A1     Jun. 11, 2015

Related U.S. Application Data

(60) Provisional application No. 61/914,566, filed on Dec. 11, 2013.

(51) Int. Cl.
*A01B 63/22* (2006.01)

(52) U.S. Cl.
CPC .................................. *A01B 63/22* (2013.01)

(58) Field of Classification Search
CPC ...... A01B 63/00; A01B 63/22; F15B 15/2815
USPC ........................................ 172/664, 665, 668
See application file for complete search history.

(56) References Cited

U.S. PATENT DOCUMENTS

| 4,793,241 | A | | 12/1988 | Mano et al. |
| 5,339,906 | A | * | 8/1994 | Fox .......................... A01B 63/22 172/4 |
| 5,905,215 | A | | 5/1999 | Jin et al. |
| 6,076,611 | A | * | 6/2000 | Rozendaal ............. A01B 63/32 172/2 |
| 6,196,328 | B1 | * | 3/2001 | McDaniel ............ A01B 59/002 172/311 |
| 6,305,478 | B1 | * | 10/2001 | Friggstad ............... A01B 63/32 172/4 |
| 6,989,669 | B2 | | 1/2006 | Low et al. |
| 7,250,753 | B2 | | 7/2007 | Terasaki |
| 7,557,568 | B2 | | 7/2009 | Terasaki |
| 7,963,208 | B2 | | 6/2011 | Terasaki |
| 8,235,130 | B2 | * | 8/2012 | Henry .................... A01B 63/22 172/239 |
| 8,240,240 | B2 | | 8/2012 | Fitzkee et al. |
| 8,240,624 | B2 | | 8/2012 | Terasaki |

(Continued)

*Primary Examiner* — Gary Hartmann
(74) *Attorney, Agent, or Firm* — Rebecca L. Henkel; Rickard K. DeMille (57) ABSTRACT

A tillage implement spanning a lateral distance relative to a forward direction and having a plurality of carrier frames, each for supporting a plurality of soil engaging tools. A pivoting wheel assembly positions the carrier frames at a variable distance from the soil and an actuator is connected between the carrier frame and each support wheel assembly to vary the height of the carrier frame. The actuator has a sensor for generating a signal reflecting the displacement of the actuator. The sensor element is mounted in an adjustable sensor support and countersunk by the required clearance between the sensor element and encoded information on the output shaft so that the sensor support may be adjusted to abut the shaft and accurately position the sensor element.

14 Claims, 5 Drawing Sheets

(56) References Cited

U.S. PATENT DOCUMENTS

| | | | |
|---|---|---|---|
| 8,738,244 B2* | 5/2014 | Lenz | A01B 63/00 340/468 |
| 2011/0231069 A1* | 9/2011 | Ryder | A01B 63/32 701/50 |
| 2013/0063132 A1 | 3/2013 | Youngner et al. | |
| 2015/0156949 A1* | 6/2015 | Henry | A01B 21/083 172/1 |
| 2015/0156950 A1* | 6/2015 | Henry | A01B 51/04 172/1 |
| 2015/0156952 A1* | 6/2015 | Henry | A01B 63/22 172/1 |

* cited by examiner

Fig. 1

PRIOR ART

AGRICULTURAL IMPLEMENT ACTUATOR SENSOR PROJECTION

CROSS REFERENCE TO RELATED APPLICATIONS

This is a non-provisional application based upon U.S. provisional patent application Ser. No. 61/914,566, entitled "AGRICULTURAL IMPLEMENT ACTUATOR SENSOR PROTECTION", filed Dec. 11, 2013, which is incorporated herein by reference.

BACKGROUND OF THE INVENTION

1. Field of the Invention

The present invention relates to agricultural implements, and, more particularly, sensors for use with actuators in such implements.

2. Description of the Related Art

In the continuing quest for providing greater efficiency in the operation of farm implements, machines have been constructed to have ever increasing lateral spans relative to a tractor or central unit propelling the unit over a field. When the span increases to realize greater efficiency and speed, the criteria of having a uniform and level tool contact with the soil becomes extremely critical. Equipment with significant lateral spans has many different joints and is usually articulated to enable transport to and between fields.

An area of special importance to level positioning of farm implements is found in the tillage field. The desirable outcome is a uniform physical depth of the tillage and a uniform entry of the disk blades or harrows into the soil. The need to have a level positioning of the implement is made more challenging with the use of hydraulic actuators which control the depth of penetration of the disk blades or other tools. In current practice, hydraulic actuators are connected in series and it is possible through normal operation for hydraulic fluid leakage to make the actuators out of sync with one another.

It is current practice to counter this occurrence by fully elevating the implement to the point where bypass lands in the actuators allow full flow of hydraulic fluid to pass through the actuators and again synchronize the multiple units. However, this adds an additional step to the operation, particularly in the field, thereby decreasing the efficiency and speed with which the particular task is accomplished. It has been proposed in co-pending application entitled "Remote Leveling of Tillage Implements", of common assignment with the present invention, to incorporate position sensors into hydraulic actuators to achieve remote leveling. With such an arrangement, the accuracy of the displacement sensors used in the system is important. Current displacement sensors are employed by fixing them at a minimum clearance from the actuator output shaft to read signals reflecting displacement of the output shaft. In the agricultural environment, the positioning of the sensor is a problem because the current practice of inserting the sensor until contact with the shaft and then backing it off may result in alteration of the sensor signal.

What is needed in the art therefore, is the accurate and safe installation of a sensor used with an agricultural implement actuator.

SUMMARY OF THE INVENTION

An advantage of the present invention is a more robust and effective sensor used in the synchronization of multiple sections of a farm implement.

In one form, the invention is an actuator for a tillage machine, the actuator including an actuator housing forming a cylinder and a piston displaceable in that cylinder in response to hydraulic fluid. An output shaft is connected to the piston and extends outside of the actuator housing to provide a variable extension in response to hydraulic fluid inputs. The shaft is encoded with information reflecting the displacement of the output shaft relative to the actuator housing. A sensor is mounted in the housing and has an end face positioned for reading the encoded information. A sensor support surrounds the sensor with the sensor being counter sunk in the sensor support by the amount of clearance necessary between the end face of the sensor and the shaft for sensing of the encoded material. The sensor support is adjustably mounted in the actuator housing to abut the output shaft.

In another form, the invention is an agricultural implement spanning a lateral distance relative to a forward direction over soil, with the implement including a plurality of carrier frames, each for supporting a plurality of soil engaging tools. At least one supporting element is carried by each carrier frame for variably positioning the carrier frame relative to the soil. An actuator is connected between each supporting element and the respective carrier frame for varying the position of the respective carrier frame relative to the soil, the actuator including a housing forming an internal cylinder and a piston displaceable in the cylinder in response to hydraulic fluid input. An output shaft is connected to the piston and extends outside of the actuator housing to connect between the carrier frame and the supporting element to vary the position of the carrier frame relative to the soil. The output shaft is encoded with information reflecting the displacement of the output shaft relative to the actuator housing. A sensor is mounted in the housing and has an end face for reading the encoded information. A sensor support surrounds the sensor with the sensor being counter sunk in the sensor support by the amount of clearance necessary for sensing of the encoded material on the output shaft with the sensor support being adjustably mounted to abut the output shaft.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention and such exemplifications is not to be construed as limiting the scope of the invention in any manner.

DETAILED DESCRIPTION OF THE INVENTION

Figure 1:
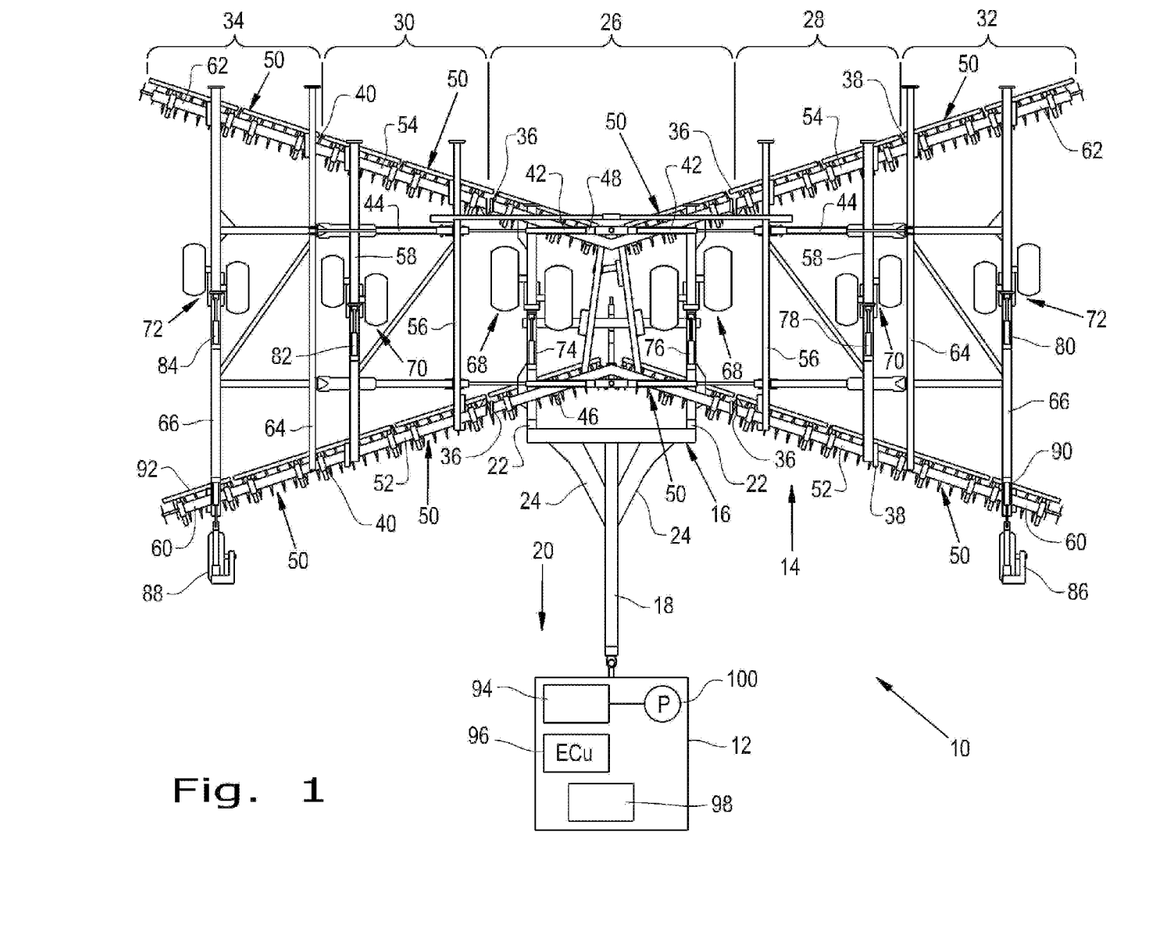
FIG. 1 illustrates a tillage implement including a support of disk blades embodying the present invention, being pulled by a tractor shown in schematic fashion.

Referring now to the drawings, and more particularly to FIG. 1, there is shown a tillage apparatus 10 which generally includes a tractor 12 shown schematically and an agricultural tillage implement 14 for tilling the soil prior to seeding. It should be noted that many different tools may be employed with the tillage implement 14 beyond the embodiment shown.

Agricultural tillage implement 14 is configured as a multi-section field disk ripper 14, and includes a carriage frame assembly 16. Carriage frame assembly 16 is the section that is directly towed by a traction unit, such as agricultural tractor 12. Carriage frame assembly 16 includes a pull hitch 18 generally extending in a travel direction 20, and forward and aft oriented carrier frame members 22 which are coupled with and extend from pull hitch 18. Reinforcing gusset plates 24 may be used to strengthen the connection between pull hitch 18 and carrier frame members 22.

The tillage implement 14 has a center section 26, an inner right wing section 28 and an outer right wing section 32 as viewed in FIG. 1. A left inner wing section 30 connects with a left outer wing section 34. The center section 26 is pivotally connected to the inner wings 28 and 30 by pivotal interconnections at 36. The right inner wing section 28 and right outer wing section 32 are pivotally interconnected at 38. The left inner wing section 30 and outer left wing section 34 are interconnected at pivotal joints 40. The details of the pivotal joints are omitted to enable a clearer understanding of the present invention. However, it should be understood that the pivotal connections allow articulation of the various sections between a field position in which each of the sections are substantially in a common plane and a transport position in which the outer wing sections 32 and 34 are folded, as well as the inner wing sections 28 and 30, to enable sufficient road clearance.

Actuator assemblies 42 are connected between the center section 26 and inner wing sections 28 and 30 to enable pivoting between the field and transport position. Actuator assemblies 44 are interconnected between right inner wing section 28 and outer right wing section 32 as well as inner left wing section 30 and outer wing section 34 to enable the pivoting movement.

The center section 26 has a forward frame member 46 extending across carrier frames 22 and secured thereto. Center section 26 additionally has an aft frame member 48 structurally interconnected with carrier frames 22 at their aft end. As is noted, the frame elements 46 and 48 extend generally laterally with respect to the direction of movement 51 of the agricultural implement. Frame members 46 and 48, however, extend at an angle as is known in the tillage art to produce appropriate working of the soil. The frame members 46 and 48 provide support beneath them for gangs of disc blades 50. The gangs of disc blades 50 are resiliently connected to the frame elements in appropriate fashion to provide smooth working of the soil.

The inner wing sections 28 and 30 each have a forward frame member 52 and an aft frame member 54. These frame members are interconnected by forward and aft oriented inner frame members 56 and outer frame members 58. The forward and aft frame members 52 and 54 form an extension of forward and aft frame members 46 and 48. The forward and aft frame members 52 and 54 each also support gangs of disc blades 50.

The outer wing sections 32 and 34 each have forward and aft frame members 60 and 62 which each support gangs of disk blades 50. Frame members 60 and 62 are interconnected by inner frame members 64 and outer frame members 66.

The various sections 26, 28, 30, 32 and 34 of the tillage implement 14 are positioned at variable positions relative to the soil and thus set the position of the gangs of disk harrows 50 above the soil and the depth they cut into the soil. As illustrated, variable support elements for the sections are shown as wheel sets but it should be understood that other forms of variable support may be employed. As illustrated, wheel sets 68 are pivotally interconnected with carrier frames 22 so that they provide support to the forward and aft frame members 46 and 48 relative to the soil. Wheel sets 70 are interconnected with frame element 58 to variably position inner wing sections 28 and 30 relative to the soil. In addition, wheel sets 72 are pivotally mounted on frame members 66 to position outer wing sections 32 and 34 at a variable distance relative to the soil. Actuators 74 and 76 manipulate wheel sets 68 to establish the distance of center section 26 relative to the soil. Actuators 78 and 80 establish the position of sections 28 and 32 relative to the soil. Finally, actuator assemblies 82 and 84 position sections 30 and 34 relative to the soil.

In addition, castor wheel assemblies 86 on section 32 and 88 on section 34 orient the for and aft angle of the tillage implement 14 relative to the soil. Actuators 90 and 92 are employed for this purpose.

The actuators described above are shown as hydraulic and for this purpose a hydraulic control unit 94 is mounted in the tractor 12 and has a pump 100 for pressurizing hydraulic fluid to control the actuators. The hydraulic control unit 94 receives inputs from an electronic control unit (ECU) 96 which receives various inputs set out below, in addition to an operator input through control unit 98.

Figure 2:
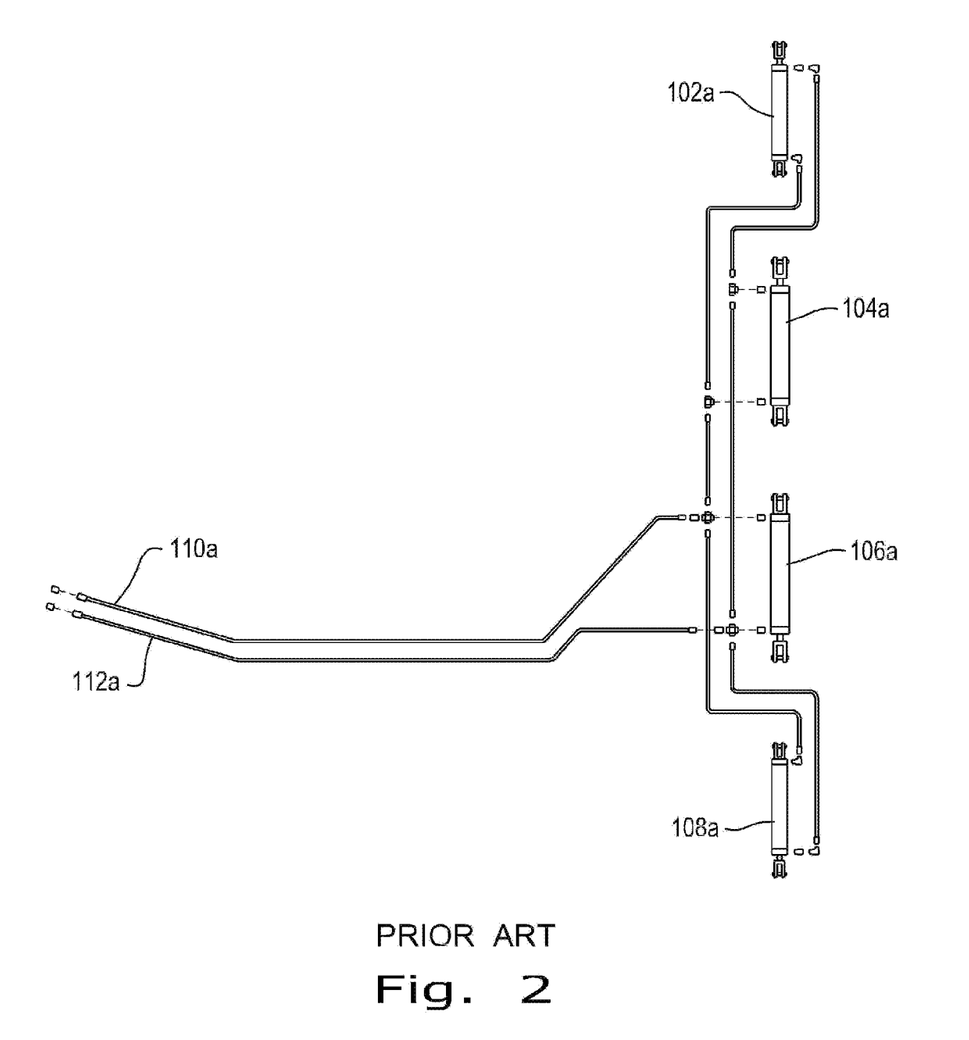
FIG. 2 is a plan view of a hydraulic system shown in the prior art for the tillage implement of FIG. 1.

The hydraulic interconnection established by a typical prior art system for elevating the various sections of the tillage implement 14 is shown in FIG. 2. In this arrangement, each of a set of actuators 102a, 104a, 106a and 108a is connected to a hydraulic control pressure by supply conduits 110a and 112a. As is illustrated in FIG. 1 the actuators 102a-108a are connected in parallel so that the pressure uniformly applies to each actuator in the set. As described above however, the actuators may become out of sync due to linkage past a piston thus requiring additional steps in the field to ensure synchronization of the actuators.

Figure 3:
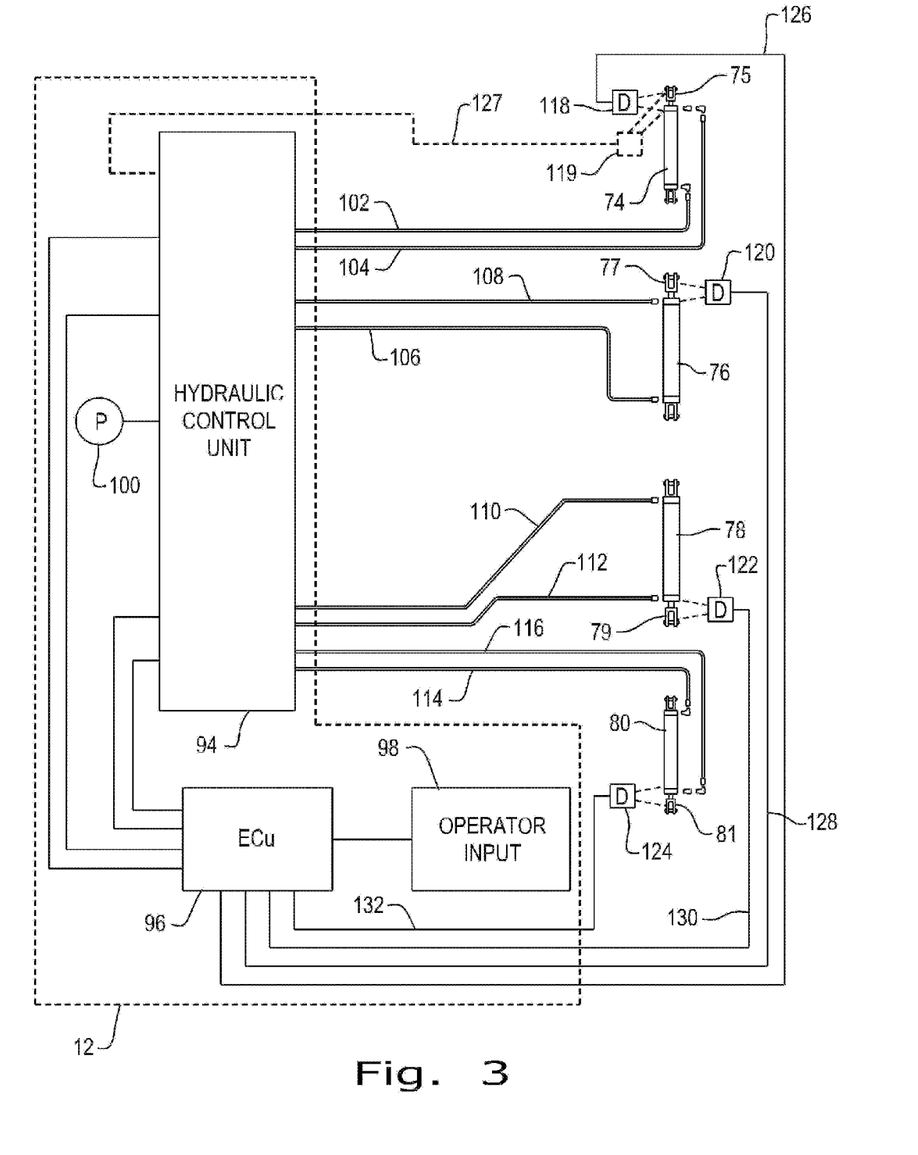
FIG. 3 is a plan view of a hydraulic system for the tillage implement of FIG. 1

In accordance with the present invention, a control system and method set forth in FIG. 3 overcomes these difficulties. FIG. 3 shows actuators 74, 76, 78 and 80. The operation of the additional actuators is similar and is omitted to enable a better understanding of the present invention. Each of the actuators 74, 76, 78 and 80 has an output shaft 75, 77, 79 and 81, respectively. The piston end of the actuator 74 is connected to the hydraulic control unit 94 by a hydraulic line 102. The output shaft end of actuator 74 is connected to the hydraulic control unit 94 by a return line 104. In similar fashion, the piston end of actuator 76 is connected by line 106 and a return line 108 is provided to control unit 94. The piston end of actuator 78 is connected to hydraulic control unit 94 by line 110 and the return line is designated as 112. Finally, the piston end of actuator 80 is connected to hydraulic control unit 94 via hydraulic line 114 and a return line 116 is provided. The independent connection of the actuators to the hydraulic control unit 94 will enable independent establishment of the height of the units relative to the soil.

The relative physical position of the hydraulic control unit 94 may be different than the one shown in FIG. 3 depending up on the application for the unit. It may be a single module or may be provided in individual control sections. However the hydraulic control unit 94 is positioned relative to the actuators, it permits independent manipulation of the actuator output shafts as will be described below.

For this purpose a displacement detecting device is provided to provide a signal proportional to the displacement of each output shaft relative to the body of the respective actuator. In addition to the displacement signal, a signal reflecting the rate of change of displacement or $\Delta D/\Delta T$ is provided. The displacement indicating devices are identified as 118 for actuators 74, 120 for actuators 76, 122 for actuator 78 and 124 for actuator 80. The displacement indicating devices 118, 120, 122 and 124 provide signal inputs to the ECU via lines 126, 128, 130 and 132, respectively. The displacement indicating devices are devices that provide appropriate control signals that are proportional to the displacement of the output shaft relative to the various actuators and preferably the rate of change of displacement. The interconnections with the two parts will be described below. Any one of a number of sensors may be employed for this purpose.

As shown, the displacement sensors and $\Delta D/\Delta T$ sensors are incorporated into a single unit. However, the $\Delta D/\Delta T$ signal may be provided in a separate unit 119 shown in dashed lines for actuator 74. Unit 119 may be connected to ECU 96 by a line 127, also shown as a dashed line. Similar units would be provided for actuators 76, 78, and 80 if it is desired to use separate units for displacement and $\Delta D/\Delta T$ signals. The invention is applied to the tillage implement of FIG. 1 by initially setting the implement on a level surface for calibration. Individual readings of the displacement between the actuator rod and the actuator body are taken with full hydraulic fluid in the chambers. The displacement signals of the individual actuators are stored in the ECU 96. The tillage implement is then in a position to have each of the actuators raise and lower the individual frame elements in unison to provide a uniform height above the ground and a uniform depth when the gangs of disk blades 50 are positioned in the soil. Periodically during the operation of the tillage implement the readings of the individual actuators are determined and if they deviate from the set point initially established the hydraulic control system provides appropriate hydraulic fluid to achieve the same set point. This is done independently of the other actuators so that correction is applied individually to each actuator unit. The tillage implement is then able to provide accurate depth of penetration among the gangs of disk harrows 50. In addition the actuators are corrected for the differential rate of displacement change by the $\Delta D/\Delta T$ so that the entry of the gangs of disk blades 50 is uniform at the beginning of the field and the withdrawal is uniform at the end of the field. The process of recalibration may be made automatic so that it does not interfere with the immediate operator directed tillage over a field and preparing the soil.

Figure 4:
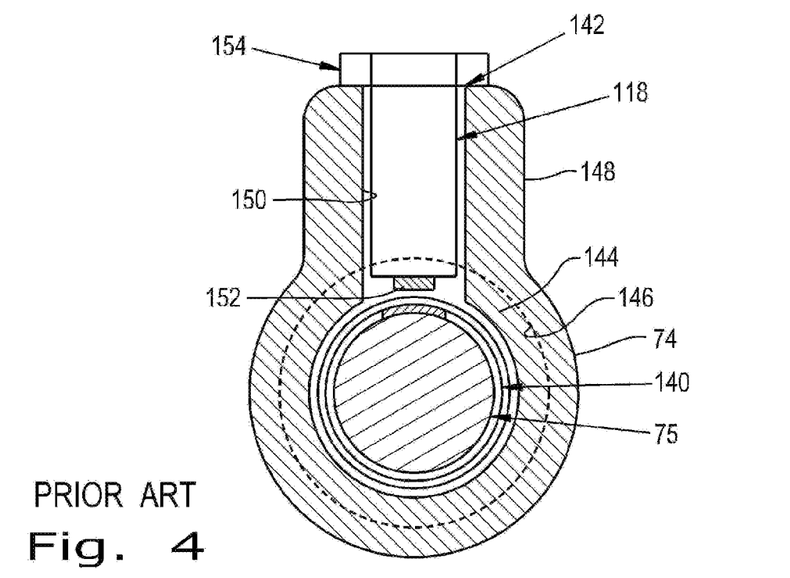
FIG. 4 is a partial detailed view of a prior art actuator used for tillage implements.

Key to the successful functioning of the system above is the accuracy of the displacement sensors 118, 120, 122 and 124. These sensors provide a signal output that reflects the actual extension of the actuator output shafts relative to the actuator housing and therefore the level of the carrier frames and gangs of disk blades 50 above the soil. FIG. 4 shows the installation of a prior art sensor, which will be illustrated in connection with actuator 74. The cross section view shows the actuator output shaft 75 having information encoded on an exterior surface 140. This information is placed longitudinally along shaft 75 so as to provide a signal with a sensor 142 that is proportional to the displacement of output shaft 75 relative to actuator housing 74, in response to hydraulic inputs on a piston 144, longitudinally displaceable in an interior chamber 146 in the actuator housing. A sensor mounting base 148 is integral with the actuator housing 74 and has an internal bore 150 for receiving the sensor 118. As illustrated, sensor 118 is cylindrical in form and fits within a corresponding opening 150 in the sensor mounting base 148. Sensor 118 has a sensor element 152 with an end face that is spaced at a given, relatively close clearance, from the encoded material 140 on shaft 75. An adjustable mounting 154, shown as a pair of nuts, allows the sensor 118 to be mounted so that there is the predetermined clearance between end face 152 and encoded material 140 on shaft 75.

It is current practice for installing sensor 118 to insert it into bore 150 until the end face of sensor element 152 abuts the encoded information 140 on shaft 75 and then back off the sensor by the degree to which a clearance must be maintained. The sensor 118 has a threaded exterior which corresponds with threads on the interior wall of cylindrical bore 50. The sensor 118 is then threaded into the bore 150 until end face 152 abuts shaft 75. The sensor 118 is then backed off by the amount necessary for the clearance which is typically less than 1 mm. Once at that estimated clearance, the lock nuts 154 are tightened to hold it in that position. One of the problems with such an arrangement for the sensor 118 is that the end face 152 may be damaged by abutting the shaft 75 since threading in can provide a significant force urging the sensor element 152 into shaft 75. This can have an adverse effect on the accuracy of the system.

Figure 5:
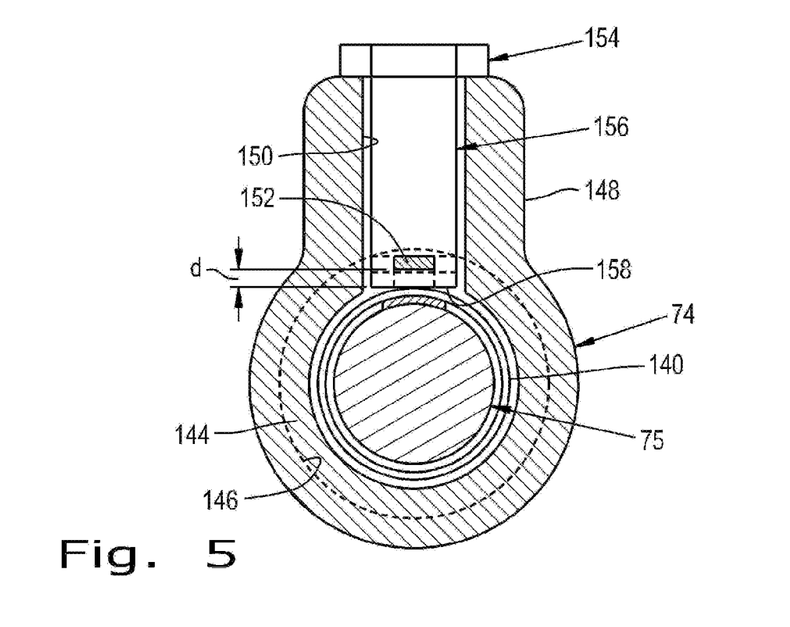
FIG. 5 is a partial detailed view of a preferred actuator used in the tillage implements of FIGS. 1 and 3.
Figure 6:
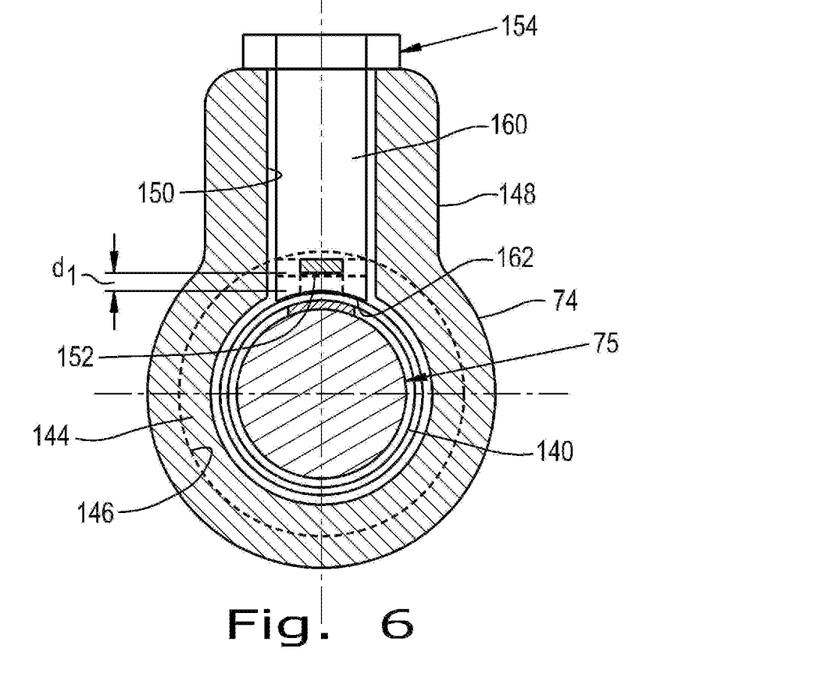
FIG. 6 is a partial detailed view of an alternate actuator used in the tillage implements of FIGS. 1 and 3.

In accordance with the present invention, the sensor support described in FIGS. 5 and 6 is employed to minimize if not eliminate this problem. The reference numbers for the actuator parts will be the same to simplify the description of the invention. In FIG. 5, a sensor support 156 is cylindrical in form and threaded into the threaded portion 150 in sensor mounting 148. The same lock mechanism 154 is positioned at the top. The sensor element 152 is recessed into the end face 158 of sensor support 156 so that the surface of sensor element 152 is a predetermined distance d from the end of end face 158 of sensor support 156. As stated above, this gap is relatively small and must be accurately maintained. As a result of the recess d, the sensor support 156 may be advanced towards output shaft 75 until it abuts the shaft. When in that position, the lock mechanism 154 may be operated to lock the sensor support 156 and hence the sensor element 152 in place at a predetermined distance from the shaft 75. Since the sensor support 156 is simply advanced until contact there is not any possibility of the sensor element 152 from being damaged. As a result, it enables an accurate and reliable setting over an extended period. The arrangement in FIG. 5 shows one such arrangement for the sensor mounting and the arrangement in FIG. 6 shows but another.

Referring now to FIG. 6, the actuator elements are the same, but the sensor support 160 is configured to have a concave face 162 facing shaft 75. The sensor element 152 is recessed into the concave end face 162 by a dimension d1 which corresponds to the gap between the sensor element 152 and the shaft 75. The feature of the concave surface 162 follows the outer contour of shaft 75 so that the sensor element 152 may be oriented properly with respect to the encoded information 140. In the application of FIG. 6, the sensor support 160 is not threaded into the bore but simply displaced linearly and oriented so that the concave surface 162 embraces the outer circumference of shaft 75. In this embodiment also, the sensor element 152 is protected from inadvertent contact to the shaft 75, thus ensuring that it will give reliable long term readings.

Preferably, the sensor supports 156 and 160 are formed from material that is wearable relative to the output shaft and especially the encoded information. Plastic material, such as nylon may be used for the sensor support.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An actuator for a tillage machine, said actuator comprising:
    an actuator housing including a sensor mount base having an opening therein, the actuator housing forming a cylinder and a piston displaceable in that cylinder in response to hydraulic fluid;
    an output shaft connected to said piston and extending outside of the actuator housing to provide a variable extension in response to hydraulic input on an opposite side of said piston;
    said output shaft being encoded with information reflecting the displacement of the shaft from the actuator housing;
    a sensor mounted in a sensor support and having an end face positioned for reading the encoded information;
    wherein the sensor support is positioned in the opening in the sensor mount base and the sensor support surrounds the sensor with the sensor counter sunk in the sensor support and spaced away from the end face of the sensor support and the output shaft for sensing and reading the encoded information, said sensor support adjustably mounted in the sensor mount base of the actuator housing and having a concave end face for abutting the output shaft, and
    wherein the concave end face of the sensor support is oriented to face a convex exterior curvature of the output shaft, the concave end face of the sensor configured to cooperatively contact and embrace a convex exterior curvature of the output shaft while spacing the sensor therefrom.

2. The actuator of claim 1, in which the sensor support is cylindrical, and the sensor mount base is cylindrical and in axial alignment with the sensor support.

3. The actuator of claim 2, in which the sensor support has external threads and said sensor mount base of the actuator housing has internal threads for receiving the sensor support to enable threading the sensor support into the sensor mount base of the actuator housing so that its end face abuts the output shaft.

4. The actuator of claim 3, in which the adjustable mounting for the sensor support comprises a lock nut set for fixing the position of the sensor support.

5. The actuator of claim 1, wherein the sensor is countersunk less than a millimeter from the end face of said sensor support.

6. The actuator of claim 1, wherein the sensor support is formed from material that is wearable relative to said output shaft.

7. The actuator of claim 6, wherein the sensor support is formed from plastic material.

8. An agricultural implement spanning a lateral distance relative to a forward direction over soil, said implement comprising:
    a plurality of carrier frames, each for supporting a plurality of soil engaging tools;
    at least one supporting element carried by each carrier frame for variably positioning said carrier frame relative to the soil;
    an hydraulic actuator connected between each supporting element and said respective carrier frame for varying the position of the respective carrier frame relative to the soil, said actuator comprising:
        a housing forming an internal cylinder and a piston displaceable in the cylinder in response to hydraulic input, the housing including a sensor mount base having an opening therein;
        an output shaft connected to the piston and extending outside of the housing to connect between the carrier frame and the supporting element to vary the position of the carrier frame, said output shaft being encoded with information reflecting the displacement of the output shaft relative to the housing; and
        a sensor mounted in a sensor support and having an end face positioned for sensing and reading the encoded information;
    wherein the sensor support is positioned in the opening in the sensor mount base and the sensor support surrounds the sensor with the sensor counter sunk in the sensor support and spaced away from the end face of the sensor support and the output shaft for sensing and reading the encoded information, said sensor support adjustably mounted in the sensor mount base of the housing and having a concave end face for abutting the output shaft, and
    wherein the concave end face of the sensor support is oriented to face a convex exterior curvature of the output shaft, the concave end face of the sensor configured to cooperatively contact and embrace a convex exterior curvature of the output shaft while spacing the sensor therefrom.

9. The agricultural implement of claim 8, in which the sensor support is cylindrical and is received in the opening of the sensor mount base of the housing.

10. The agricultural implement of claim 9, in which the sensor support has external threads and the sensor mount base has internal threads receiving said sensor support whereby the threading of the sensor support positions its end face relative to said output shaft.

11. The agricultural implement of claim 10, in which the sensor support is mounted using a lock nut assembly acting against the sensor mount base.

12. The agricultural implement of claim 8, in which the sensor element is countersunk less than a millimeter from the end face of said sensor support.

13. The agricultural implement of claim 8, wherein the sensor support is formed from material that is wearable relative to said output shaft.

14. The agricultural implement of claim 13, wherein the sensor support is formed from plastic material.

* * * * *

UNITED STATES PATENT AND TRADEMARK OFFICE
CERTIFICATE OF CORRECTION

PATENT NO. : 9,585,298 B2  
APPLICATION NO. : 14/565854  
DATED : March 7, 2017  
INVENTOR(S) : James W. Henry et al.

Page 1 of 1

It is certified that error appears in the above-identified patent and that said Letters Patent is hereby corrected as shown below:

On the Title Page

Item (54) and in the Specification, Column 1, Line 2, in the title, please delete "PROJECTION" and substitute therefore --PROTECTION--.

Signed and Sealed this  
Sixth Day of June, 2017

Michelle K. Lee  
*Director of the United States Patent and Trademark Office*